R. M. CHAMBERS.
WEEDER.
APPLICATION FILED AUG. 18, 1909.

962,940.

Patented June 28, 1910.

Witnesses
Frank B. Hoffman
U. B. Hillyard

Inventor
Roscoe M. Chambers
By Victor J. Evans
Attorney

UNITED STATES PATENT OFFICE.

ROSCOE M. CHAMBERS, OF EARL, NEBRASKA.

WEEDER.

962,940.  Specification of Letters Patent.  Patented June 28, 1910.

Application filed August 18, 1909. Serial No. 513,424.

*To all whom it may concern:*

Be it known that I, ROSCOE M. CHAMBERS, a citizen of the United States, residing at Earl P. O., in the county of Frontier and State of Nebraska, have invented new and useful Improvements in Weeders, of which the following is a specification.

This invention appertains to agricultural implements and more particularly to the type designed for cultivating the soil, thereby preventing the growth of weeds and, at the same time, loosening the earth about the roots of young plants.

The purpose of the invention is the provision of an implement of the character aforesaid which will prevent choking and practically self-clearing, so as to shed the weeds and prevent their interfering with the operation of the implement or necessitating the stopping of the same and the removal of the weeds or other accumulative matter or trash.

The invention consists of the novel features, details of construction and combination of parts, which hereinafter will be more particularly set forth, illustrated in the accompanying drawings, and pointed out in the appended claims.

Figure 1:
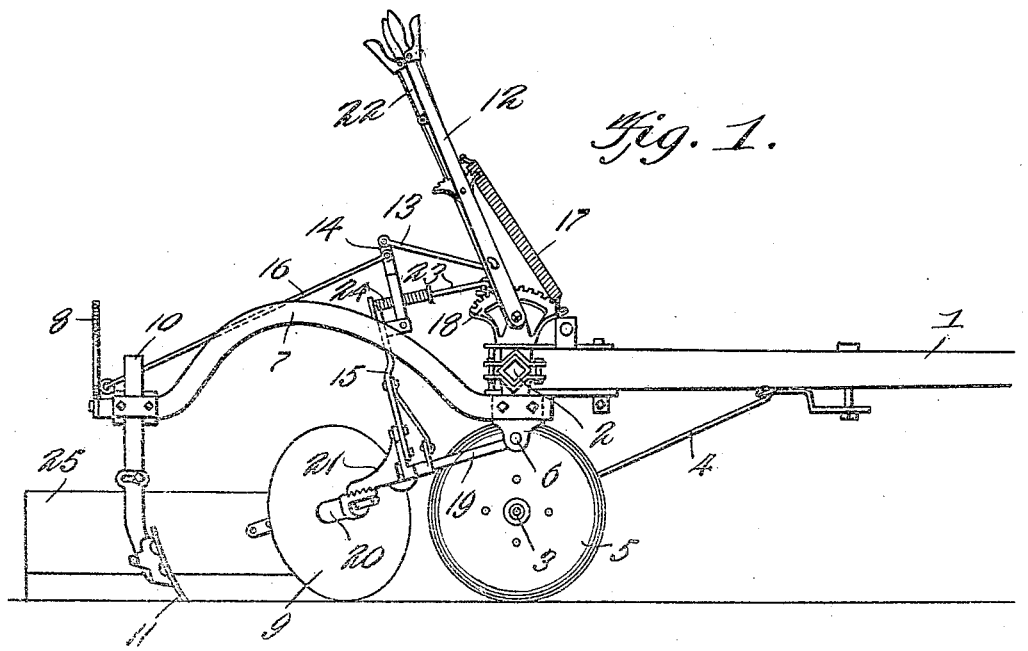
Figure 2:
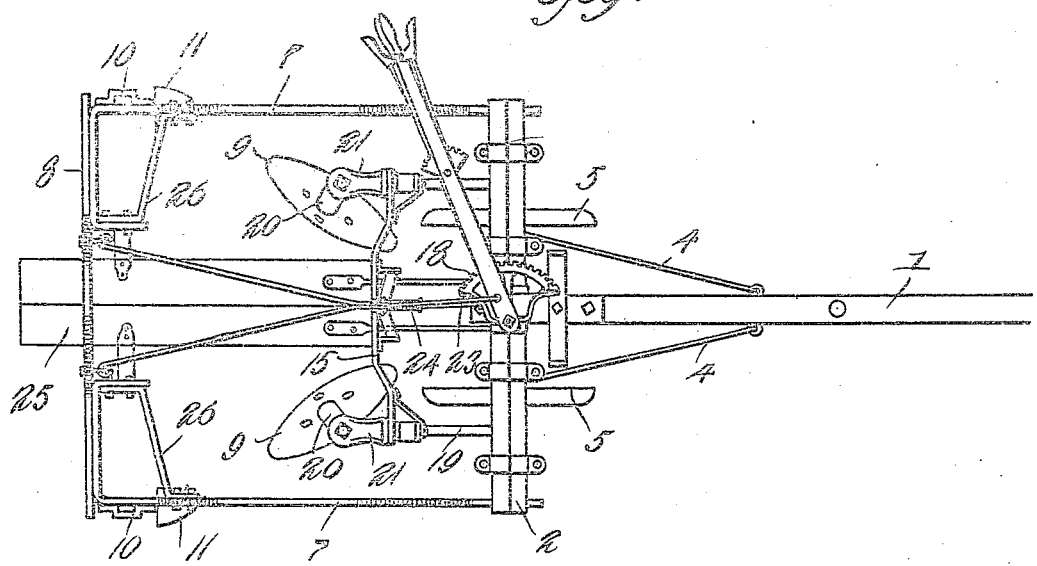

Referring to the drawings, forming a part of the specification, Figure 1 is a side view of an implement of the character herein stated, embodying the invention. Fig. 2 is a top plan view of the implement.

Corresponding and like parts are referred to in the following description, and in both views of the drawings, by the same reference characters.

The implement comprises a pole or tongue 1 and a transverse bar 2, the latter having the pole or tongue secured thereto in any substantial way. An axle 3 is secured to the transverse bar 2 in any manner so as to support the same and the rear portion of the pole 1, and draft rods 4 connect the axle 3 with the pole or tongue 1. Supporting wheels 5 are mounted upon the axle 3.

A rod 6 is located beneath the bar 2 and is connected thereto in any manner. Longitudinal beams 7 are mounted upon the rod 6 to turn thereon and are connected at their rear ends by means of an arched bar 8. The beams 7 are upwardly deflected between their ends to provide ample clearance for weeds or trash and to prevent the same accumulating between the beams and the disk cutters 9. The beams 7 are provided, at their rear ends, with standards 10 having shovel blades 11 at their lower ends. The rear ends of the beams are vertically adjustable to raise or lower the shovel blades 11. An operating lever 12 is connected by means of a rod 13 with a lever 14 pivoted to the extension of a transversely arranged arched member 15. Rods or other connections 16 are pivotally attached, at their front ends, to the lever 14 and, at their rear ends to the arched bar 8 and may be moved vertically either to raise or to lower the blades 11. A spring 17 connects the upper portion of the lever 12 with a toothed standard 18 mounted upon either the pole 1 or the transverse bar 2 and adapted to coöperate with a hand latch carried by the lever 12 to secure said lever in an adjusted position to hold the shovel blades 11 elevated at the required point.

Beams 19 are pivotally connected, at their front ends, to transverse rods 6 and are connected, at their rear ends, by means of the arched bar 15. The disk cutters 9 are mounted upon axles carried by castings 20 which have adjustable connection with castings 21 secured to the arched bar 15. The beams 19 and the arched bar 15 are braced. A lever 22 is connected by means of a rod 23 with the upper portion of the arched bar 15, a spring 24 being mounted upon the rod 23 and coming between a stop thereof and the arched bar 15 to admit of the disk cutters 9 having a limited vertical movement so as to pass over unyielding objects without producing injury, either to the cutters or to the coöperating parts. The disk cutters 9 are likewise adjusted vertically by means of the lever 22 to suit the nature of the soil and the particular work in hand.

A fender 25 is located centrally of the machine, in line with the pole or tongue 1, and is connected at its front end to the transverse bar 2 in any convenient way. The rear portion of the fender 25 is connected to brackets 26, located in the angles formed between the beams 7 and the arched bar 8. The fender 25 is adapted to extend over the plants and protect the same during the weeding or cultivating operation. By having the fender 25 connected with said beams 7 and bar 8, it is raised and lowered with the beams.

The disk cutters 9 are located below or in line with the arched portions of the beams 7, hence ample clearance is had between said beam and cutters for the unobstructed passage of weeds, trash and the like without catching and accumulating and choking of the space between the cutters and said beam.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new is:—

1. In combination, a pole, a transverse bar connected to said pole, a rod arranged beneath said bar and connected thereto, an axle provided with supporting wheels having connection with said bar, draft rods between said axle and pole, beams connected to said rod and provided with disk cutters, longitudinal beams having their front ends connected with said rod and upwardly arched between their ends and provided with cultivator shovels, the arched portions of the beams being in line with said disk cutters, means for raising and lowering the longitudinal beams and means for adjusting the beams provided with the disk cutters.

2. In combination a main frame comprising a transverse bar and a pole, a transverse rod connected with the main frame, an axle provided with supporting wheels, longitudinal beams provided at their rear ends with shovel blades, an arched bar connecting the rear ends of the longitudinal beams, a second set of beams connected with the transverse rod and provided with disk cutters, an arched bar connecting the second set of beams, an operating lever mounted upon the main frame, a second lever pivoted to the arched bar connecting said second set of beams, connecting means between said operating lever and said second lever, other connecting means between said second lever and the arched bar connecting the rear ends of the aforesaid longitudinal beams, a spring between the operating lever and the main frame, a second operating lever, a bar connecting the second operating lever with the arched bar connecting the second set of beams, and a spring mounted upon the last mentioned rod and confined thereon between a stop and the arched bar connecting the second set of beams.

In testimony whereof I affix my signature in presence of two witnesses.

ROSCOE M. CHAMBERS.

Witnesses:
   C. S. FUNIS,
   L. P. SOMSON.